United States Patent
Miyamoto et al.

(10) Patent No.: US 9,846,679 B2
(45) Date of Patent: Dec. 19, 2017

(54) COMPUTER AND GRAPH DATA GENERATION METHOD

(71) Applicant: HITACHI, LTD., Tokyo (JP)

(72) Inventors: Atsushi Miyamoto, Tokyo (JP); Yasuyuki Kudo, Tokyo (JP); Junichi Miyakoshi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 33 days.

(21) Appl. No.: 15/109,320

(22) PCT Filed: Feb. 3, 2014

(86) PCT No.: PCT/JP2014/052441
§ 371 (c)(1),
(2) Date: Jun. 30, 2016

(87) PCT Pub. No.: WO2015/114830
PCT Pub. Date: Aug. 6, 2015

(65) Prior Publication Data
US 2016/0321213 A1 Nov. 3, 2016

(51) Int. Cl.
*G06F 17/10* (2006.01)
*G06F 17/15* (2006.01)
*G06K 9/62* (2006.01)

(52) U.S. Cl.
CPC ............ *G06F 17/15* (2013.01); *G06F 17/10* (2013.01); *G06K 9/6228* (2013.01)

(58) Field of Classification Search
CPC ............ G06F 7/10; G06F 7/15; G06K 9/6228
See application file for complete search history.

(56) References Cited

U.S. PATENT DOCUMENTS

| | | | | |
|---|---|---|---|---|
| 7,337,090 B1* | 2/2008 | Yemini | ............... | G06F 11/2257 |
| | | | | 702/181 |
| 7,451,124 B2* | 11/2008 | Handley | ............. | G06F 17/2785 |
| | | | | 706/12 |
| 9,311,729 B2* | 4/2016 | Isozaki | ................. | G06T 11/206 |
| 2001/0011958 A1 | 8/2001 | Lee et al. | | |
| 2007/0203870 A1* | 8/2007 | Saito | ....................... | G06F 17/10 |
| | | | | 706/52 |

FOREIGN PATENT DOCUMENTS

JP 2007-087125 A 4/2007

\* cited by examiner

*Primary Examiner* — Chuong D Ngo
(74) *Attorney, Agent, or Firm* — Volpe and Koenig, P.C.

(57) ABSTRACT

A computer utilizes correlation matrix data including a value indicating correlation between indicators and comprises a graph process unit that includes a control factor calculation unit configured to calculate a control factor for generating compressed graph data based on a constraint condition on a process; and a graph generation unit configured to generate graph data from the correlation matrix data by using the control factor. The control factor calculation unit obtains a target process time as the constraint condition; calculates a maximum of a number of edges to be included in the graph data; calculates a threshold for extracting the elements converted from the correlation matrix data to the graph data based on the maximum of the number of edges; and outputs the threshold as the control factor. The graph generation unit extracts the elements from the correlation matrix data based on the threshold, and generates the graph data.

10 Claims, 17 Drawing Sheets

|  | INDICATOR 1 | INDICATOR 2 | INDICATOR 3 | INDICATOR 4 | ... |
|---|---|---|---|---|---|
|  | PURCHASE PRICE (YEN) | NUMBER OF ITEMS PURCHASED (NO.) | STAY TIME (MINUTES) | STOPPING TIME (MINUTES) | ... |
| CUSTOMER 1 | 1500 | 3 | 45 | 25 | ... |
| CUSTOMER 2 | 1000 | 2 | 32 | 10 | ... |
| CUSTOMER 3 | 3500 | 4 | 64 | 38 | ... |
| ⋮ | ⋮ | ⋮ | ⋮ | ⋮ | ⋮ |

|  | INDICATOR 1 | INDICATOR 2 | INDICATOR 3 | INDICATOR 4 | INDICATOR 5 |
|---|---|---|---|---|---|
| INDICATOR 1 | 1.0 | 0.11 | 0.43 | −0.12 | 0.13 |
| INDICATOR 2 | 0.11 | 1.0 | 0.56 | 0.45 | 0.08 |
| INDICATOR 3 | 0.43 | 0.56 | 1.0 | −0.13 | −0.25 |
| INDICATOR 4 | −0.12 | 0.45 | −0.13 | 1.0 | 0.48 |
| INDICATOR 5 | 0.13 | 0.08 | −0.25 | 0.48 | 1.0 |

VERTEX LIST

| VERTEX ID (1201) | INDICATOR ID (1202) | CONNECTED EDGE INFORMATION (1203) |
|---|---|---|
| VERTEX 1 | INDICATOR 1 | |
| VERTEX 2 | INDICATOR 2 | |
| VERTEX 3 | INDICATOR 3 | |
| VERTEX 4 | INDICATOR 4 | |
| VERTEX 5 | INDICATOR 5 | |

EDGE LIST

| EDGE ID (1211) | CONNECTED VERTEX A (1212) | CONNECTED VERTEX B (1213) | WEIGHT (1214) |
|---|---|---|---|
| | | | |

|  | INDICATOR 1 | INDICATOR 2 | INDICATOR 3 | INDICATOR 4 | INDICATOR 5 |
|---|---|---|---|---|---|
| INDICATOR 1 | 1.0 | 0.11 | 0.43 | −0.12 | 0.13 |
| INDICATOR 2 | 0.11 | 1.0 | 0.56 | 0.45 | 0.08 |
| INDICATOR 3 | 0.43 | 0.56 | 1.0 | −0.13 | −0.25 |
| INDICATOR 4 | −0.12 | 0.45 | −0.13 | 1.0 | 0.48 |
| INDICATOR 5 | 0.13 | 0.08 | −0.25 | 0.48 | 1.0 |

|  | INDICATOR 1 | INDICATOR 2 | INDICATOR 3 | INDICATOR 4 | INDICATOR 5 |
|---|---|---|---|---|---|
| INDICATOR 1 | 1.0 | 0 | 0.43 | 0 | 0 |
| INDICATOR 2 | 0 | 1.0 | 0.56 | 0.45 | 0 |
| INDICATOR 3 | 0.43 | 0.56 | 1.0 | 0 | −0.25 |
| INDICATOR 4 | 0 | 0.45 | 0 | 1.0 | 0.48 |
| INDICATOR 5 | 0 | 0 | −0.25 | 0.48 | 1.0 |

VERTEX LIST

| VERTEX ID | INDICATOR ID | CONNECTED EDGE INFORMATION |
|---|---|---|
| VERTEX 1 | INDICATOR 1 | EDGE 1, EDGE 2 |
| VERTEX 2 | INDICATOR 2 | EDGE 3, EDGE 4, EDGE 5 |
| VERTEX 3 | INDICATOR 3 | EDGE 2, EDGE 4, EDGE 6, EDGE 7 |
| VERTEX 4 | INDICATOR 4 | EDGE 5, EDGE 8, EDGE 9 |
| VERTEX 5 | INDICATOR 5 | EDGE 7, EDGE 9, EDGE 10 |

*FIG. 14A*

EDGE LIST

| EDGE ID | CONNECTED VERTEX A | CONNECTED VERTEX B | WEIGHT |
|---|---|---|---|
| EDGE 1 | VERTEX 1 | VERTEX 1 | 1.0 |
| EDGE 2 | VERTEX 1 | VERTEX 3 | 0.43 |
| EDGE 3 | VERTEX 2 | VERTEX 2 | 1.0 |
| EDGE 4 | VERTEX 2 | VERTEX 3 | 0.56 |
| EDGE 5 | VERTEX 2 | VERTEX 4 | 0.45 |
| EDGE 6 | VERTEX 3 | VERTEX 3 | 1.0 |
| EDGE 7 | VERTEX 3 | VERTEX 5 | -0.25 |
| EDGE 8 | VERTEX 4 | VERTEX 4 | 1.0 |
| EDGE 9 | VERTEX 4 | VERTEX 5 | 0.48 |
| EDGE 10 | VERTEX 5 | VERTEX 5 | 1.0 |

*FIG. 14B*

| SIGN BIT | RANG OF ABSOLUTION VALUE OF CORRELATION VALUE |
|---|---|
| 00 | 0.0~0.25 |
| 01 | 0.25~0.5 |
| 10 | 0.5~0.75 |
| 11 | 0.75~1.0 |

*FIG. 19*

COMPUTER AND GRAPH DATA GENERATION METHOD

BACKGROUND OF THE INVENTION

The present invention relates to a computer for big data analytics using graph data, and a graph data generation method therefor.

Big data analytics in which useful knowledge (information) is extracted by using a vast amount of data (big data) obtained from the Web or sensors, or the like, has been gaining attention. Big data analytics is designed to extract, as knowledge, correlations and patterns of the items hidden within the data by applying data analysis techniques including statistics, pattern recognition and artificial intelligence, or the like to the vast amount of data in a comprehensive manner. Big data analytics is sometimes referred to as data mining as it mines underlying information hidden in data. Techniques for big data analytics include, for example, correlation analysis, regression analysis and principle component analysis used in statistics, and pattern recognition, machine learning and clustering.

In order to obtain useful knowledge in big data analytics, the vase amount of data needs to be analyzed. However, as an amount of data to be analyzed becomes larger and the methods for data analysis become more complicated, processing time and memory usage or the like would generate an excessive amount of load imposed on hardware resources, which is problematic. In particular, in the fields of social infrastructure, it has been expected to output results efficiently in a limited amount of time by using the limited resources.

For example, basic statistical data analysis techniques such as the correlation analysis and the principal component analysis generate indicators (feature amount, item) from big data, and obtain a correlation between the indicators. At this point, the correlation that includes m number of indicators will be given as an m-by-n correlation matrix, and the correlation analysis and the principal component analysis will be executed by the operation of the correlation matrix. However, there is needed to store the data for all of the elements, because the matrix operation will be executed with respect to all elements. Accordingly, a system that handles big data may perform substantially inefficiently in terms of calculation amount and memory usage. As a result, storing and calculation process of the big data (correlation matrix) having a large number of indicators make large loads to the hardware resources.

As for methods to compress and efficiently process big data, U.S. Unexamined Patent Application Publication No. 2001/0011958 A discloses a technique therefor. The U.S. Unexamined Patent Application Publication No. 2001/0011958 A discloses a technique to reduce the cost of communication and storing of data for converting big data by using a multivariate data analysis method, and compressing and reconfiguring the big data. The method disclosed in the U.S. Unexamined Patent Application Publication No. 2001/0011958 includes a step for acquiring a m-by-n correlation matrix from original data of an m item in n row, a step of obtaining an eigenvalue and an eigenvector of the correlation matrix, a step of obtaining the matrix of the factor loading from the eigenvalue and the eigenvector, a step of generating a 1-by-p random matrix, a step of obtaining an 1-by-m intermediate data matrix by multiplying the random matrix by the factor loading matrix, and a step of obtaining a 1-by-m data matrix that is reconfigured by scaling the intermediate data column for n number of sample and m number of indicators. The technique capable of reducing the cost of communication and the storing data by reconfiguring data is disclosed in the U.S. Unexamined Patent Application Publication No. 2001/0011958 discloses.

SUMMARY OF THE INVENTION

The method disclosed the in the U.S. Unexamined Patent Application Publication No. 2001/0011958 A regards compressing the sample number of the original data to n as the main theme for reducing the storing data and the cost of communication, which does not fully take the limitation on the hardware resources responsible for implementing the analysis process into consideration. Even more, the method disclosed in the U.S. Unexamined Patent Application Publication No. 2001/0011958 A is required to, when executing the correlation analysis and the principal component analysis, reconfigure the compressed data columns, convert data to the original format before calculating the correlation matrix, and then execute the analysis process. Because of this, the method disclosed in the U.S. Unexamined Patent Application Publication No. 2001/0011958 A requires the number of indicators (m) to be, as a prerequisite, sufficiently small with respect to the number of samples (n).

If the data has increased with the passage of time When the m-by-n correlation matrix becomes too large to be stored in the memory with increasing the number of indicators (m), it can be problematic in that the data analysis such as the correlation analysis and the principal component analysis cannot be executed. Since an analysis of social infrastructure can include more than 1 million indicators for explaining the matter, it is imperative that analysis be efficient as the number of indicators increases.

The present invention is intended to resolve the above stated problems, and the aim thereof is to, when analyzing the correlation matrix that includes a large number of indicators, compress the amount of data to reduce the amount of data and to make the process more efficient.

The present invention can be appreciated by the description which follows in conjunction with the following figures, wherein: a computer comprises a processor and a memory coupled to the processor, configured to execute a process by using correlation matrix data which includes a plurality of elements each of which is a value indicating correlation between a plurality of indicators. The computer comprises a graph generation unit configured to generate graph data from the correlation matrix data obtained from a storage apparatus, the graph data includes a plurality of vertexes each of which corresponds to an indicator, a plurality of edges each of which connects two of vertexes having correlation, and a plurality of weights of the plurality of edges each of which indicates a value of a element. The graph process unit includes: a control factor calculation unit configured to calculate a control factor for generating compressed graph data based on a constraint condition on a process by using the correlation matrix data; and a graph generation unit configured to generate the graph data from the correlation matrix data by using the control factor. The control factor calculation unit is configured to: obtain a target process time which is a completion time for the process by using the correlation matrix data, as the constraint condition; calculate a maximum of a number of edges to be included in the graph data to complete a process within the target process time; calculate a threshold for extracting the plurality of elements converted from the correlation matrix data to the graph data based on the maximum of the number of edges; and output the threshold as the control factor to the graph data generation unit. The graph generation unit is configured to: extract at least one of the plurality of elements from the correlation matrix data based on the threshold, and generate the graph data by generating information of the plurality of vertexes, the plurality of edges, and the plurality of weights of the plurality of edges based on a combination of the plurality of indicators for identifying the extracted at least one of the plurality of elements and a value of the at least one of the plurality of elements.

According to this invention, it can convert the correlation matrix data having a large number of indicators into compressed graph data in accordance with constraint conditions. This enables a high speed graph processing such as the correlation analysis, the principal component analysis, or the like, because of reducing the amount of data.

Objects, configurations, and effects other than those described above become apparent from the following descriptions of embodiments of this invention.

BRIEF DESCRIPTION OF THE DRAWINGS

The present invention can be appreciated by the description which follows in conjunction with the following figures, wherein:

FIG. 3 is an explanatory diagram illustrating an example of business data according to the first embodiment of the present invention;

FIG. 4 is an explanatory diagram illustrating an example of correlation matrix data according to the first embodiment of the present invention;

FIG. 12A is an explanatory diagram illustrating an example of a vertex list which will be used for the graph data generation process according to the first embodiment of the present invention;

FIG. 12B is an explanatory diagram illustrating an example of an edge list which will be used for the graph data generation process according to the first embodiment of the present invention;

FIG. 14A and FIG. 14B are explanatory diagram illustrating the vertex list and the edge list after being executed the graph data generation process according to the first embodiment of the present invention;

FIG. 19 is an explanatory diagram illustrating an example of rounding of bits representing the correlation value according to the second embodiment of the present invention.

DETAILED DESCRIPTION OF THE EMBODIMENTS

Figure 1:
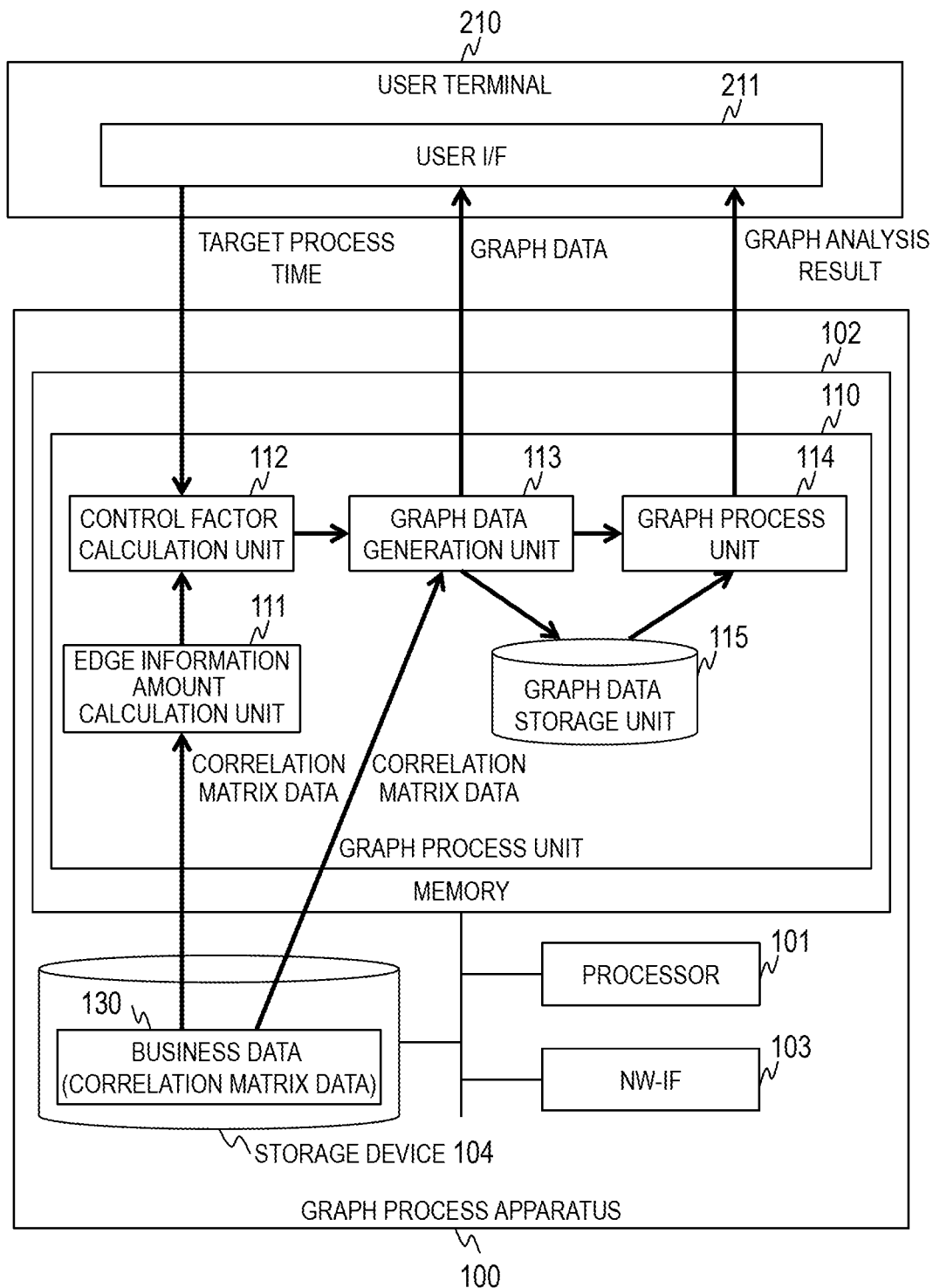
FIG. 1 is a block diagram illustrating an example of a configuration of a graph process apparatus according to a first embodiment of the present invention.

Hereinafter, embodiments of the present invention will be described with reference to the accompanying drawings. In the accompanying drawings, elements having the same functions will be denoted with the same numerals. Note that while the accompanying drawings show specific embodiments that conform to the principles of the present invention, they are only intended to facilitate the understanding of the present invention, and that they are by no means intended to limit the present invention to the specific embodiment illustrated therein.

First, an overview of the present invention will be described.

When executing an analysis process such as correlation analysis to business data, correlation matrix data indicating the correlation among indicators (feature amounts, items, etc.) is generated from the business data. In a case where there are m numbers of indicators, the correlation matrix data will be an m-by-m matrix data. The correlation matrix data is data that includes combinations of indicators identifying the elements and values of the elements.

Since big data analytics involves a large number of indicators, the size of the correlation matrix data is correspondingly large. So it can not store the correlation matrix data in a memory. Thus, in a case of executing an analysis process on business data, frequent access to a storage apparatus, or the like, would be necessary in order to obtain the correlation matrix data. Accordingly, processing delays would be generated due to access to the storage apparatus.

Also, the mm-by-m correlation matrix data includes (m*m) number of elements, it would be required all of the data elements to be processed in the analysis. Even when the value is "0" that indicates there is no correlation between indicators, the value "0" needs to be included. Accordingly, as the number of indicators increases, the cost and the amount of data therefor increase.

(1) Conversion to Graph Data

To resolve the above stated problem, a graph process apparatus 100 (See FIG. 1) of the present invention converts the correlation matrix data into graph data. Here, the graph data is data consisting of vertexes each of which indicates the indicator, edges each of which connects two vertexes that are correlated, and weights of the edges each of which indicates a value of the element. The graph data allows the connection between vertexes to be understood via graph. The weight of the edge indicates the strength of the correlation between the indicators connected by the edge.

Since there is no edge between the vertexes having no correlation, the graph data will not need to include the data which shows that there is no correlation. Also, when all of vertexes are not connected with any other, there is no need to have such data. On the other hand, the correlation matrix data requires, even when there is no correlation between two indicators, that an element whose value is "0" to be included. Accordingly, an amount of data of the graph data is smaller than the amount of data of the correlation matrix data.

Therefore, it can reduce the amount of data by converting the correlation matrix data into graph data. In the present invention, the graph process apparatus 100, not only coverts the correlation matrix data into graph data, converts the correlation matrix data into graph data that is compressed in accordance with constraint conditions of graph processing. To be more specific, the present invention includes 2 processes as below.

(2) Adjustment of Number of Edges to be Included Graph Data

Converting correlation matrix data into graph data as is does not necessarily reduce the amount of data in a sufficient manner. Accordingly, the graph process apparatus 100 (See FIG. 1) according to the present invention adjust the number of edges to be included in graph data in accordance with a target process time that is processing completion time of the analysis process.

To be more specific, the graph process apparatus 100 determines a threshold for rounding off the correlation values based on the target process time. Further, the graph process apparatus 100 sets the value (absolute value) of each o elements, whose size of the value of the element is equal to or smaller than the threshold, as "0", and then, converts the same to the graph data. As stated above, "0" indicates that there is no correlation between given indicators, and there is no edge in a case where there is no correlation. Accordingly, the number of edges included in the graph data may be reduced.

(3) Rounding of Bit Representing Weight of Edge

The graph process apparatus 100 according to the present invention rounds the number of bits representing the weight of the edge in accordance with a memory capacity. By this, the graph data can be further compressed so that it can be stored at a memory.

By executing the processes as stated above, the amount of data can be reduced as necessary for the process. In other words, it is possible to speed up process at a high speed by storing all graph data to the memory, and reduce the processing cost by reducing the amount of data.

First Embodiment

Figure 2:
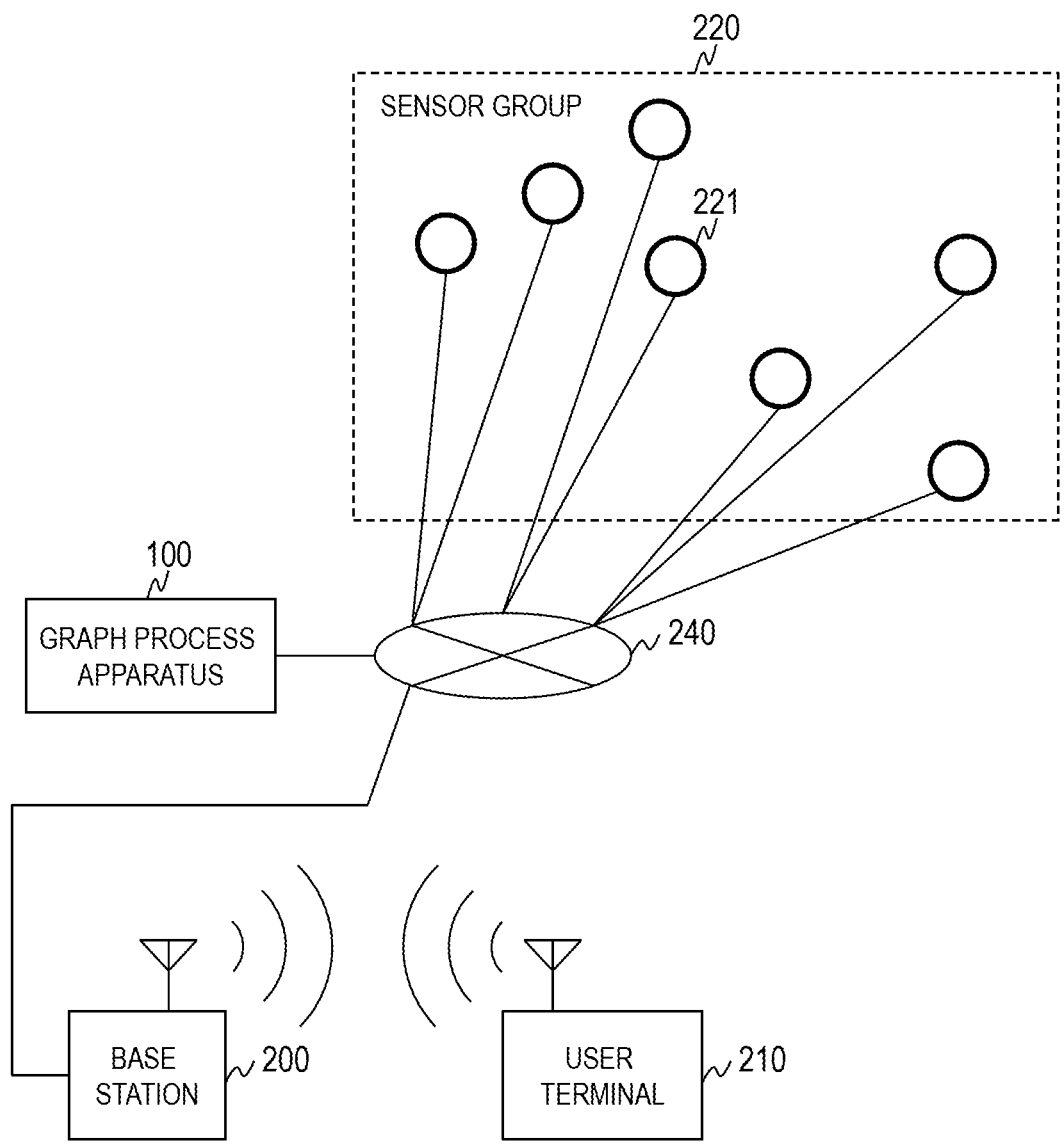
FIG. 2 is a block diagram illustrating an example of a system configuration in which the graph process apparatus according to the first embodiment of the present invention is implemented.

FIG. 1 is a block diagram illustrating an example of a configuration of a graph process apparatus 100 according to a first embodiment of the present invention. FIG. 2 is a block diagram illustrating an example of a system configuration in which the graph process apparatus 100 according to the first embodiment of the present invention is implemented.

The system illustrated in FIG. 2 includes the graph process apparatus 100, a base station 200, a user terminal 210 and a sensor group 220.

The graph process apparatus 100, the base station 200 and a plurality of sensors 221 included in the sensor group 220 are connected with one another via a network 240. The network 240 may include WAN, LAN or the like, for example; the present invention is not limited to the type of the network 240.

The user terminal 210 is connected with the graph process apparatus 100, or the like, via the base station 200 and a wireless communication. Note that the user terminal 210 may be connected with the base station 200 via cable communications, or the user terminal 210 may be connected directly with the network 240.

The graph process apparatus 100 obtains business data 130 from each sensors 221 included in the sensor group 220, and stores the obtained business data 130 in a storage apparatus 104. Also, the graph process apparatus 100 executes a graph processing in accordance with an instruction from the user terminal 210.

The user terminal 210 may include a personal computer or a tablet terminal or the like, for example. The user terminal 210 includes a processor (illustration omitted), a memory (illustration omitted), a network interface (illustration omitted), and an input/output device (illustration omitted). The input/output device may include a display, a keyboard, a mouse, or a touch panel, or the like.

The user terminal 210 provides a user interface 211 for operating the graph process apparatus 100. The user interface 211 inputs a target processing time to the graph process apparatus 100, and received graph data and results of the graph processing, or the like, outputted by the graph process apparatus 100.

The graph process apparatus 100 includes, as its hardware configuration, a processor 101, a memory 102, a network interface 103, and a storage apparatus 104.

The processor 101 executes the programs stored in the memory 102. As the processor 101 executes the programs, each function unit having the graph process apparatus 100 is realized. Note that when a process is described primarily in connection with a function part in the following description, it is to be understood that a program for realizing the function part is executed by the processor 101.

The memory 102 stores therein the programs executed by the processor 101 and information required to execute those programs. The memory 102 may include DRAM, or the like. The programs and the information stored in the memory 102 will be described later. The network interface 103 is an interface configured to be connected with an external apparatus via the network such as WAN or LAN.

The storage apparatus 104 stores therein various types of information. The storage apparatus 104 may include an HDD, an SSD or the like. According to the present embodiment, the storage apparatus 104 stores therein the business data 130. Note that the storage apparatus 104 may store therein correlation matrix data that indicates the correlation among various data on the business data 130.

Here, an example of the business data 130 and correlation matrix data 400 will be described with reference to FIG. 3 and FIG. 4.

FIG. 3 is an explanatory diagram illustrating an example of the business data 130 according to the first embodiment of the present invention. FIG. 4 is an explanatory diagram illustrating an example of the correlation matrix data 400 according to the first embodiment of the present invention.

FIG. 3 illustrates the business data 130 at a store. The business data 130 stores therein information such as purchase price, the number of items purchased, a stay time, and a stopping time. The "purchase price", the "number of items purchased", the "stay time", and the "stopping time" will be referred to as indicators.

The correlation matrix data 400 is matrix data whose elements are correlations among the indicators. For example, the matrix data according to the present embodiment includes the information, as an element thereof, that indicates the correlation between an index 1 "purchase price" and an index 2 "the number of items purchased." Here, the correlation between the index 1 and the index 2 is given as a correlation value. For example, the correlation value may be obtained by equation (1) below.

[Equation 1]

$$\frac{S12}{S1 \times S2} \quad (1)$$

Here, S1 denotes the standard deviation of the index 1; S2 denotes the standard deviation of the index 2; and S12 denotes the covariance between the index 1 and the index 2.

The correlation value includes a value that is equal to or greater than "−1" and equal to or less than "1", where the closer to "1" the correlation value is, the more likely it is to be positive the correlation is, and the closer to "−1" the correlation value is, the more likely it is to be negative the correlation is. Also, the closer to "0" the correlation value is, the more likely there is no correlation between the indexes is.

That is, the correlation matrix data 400 has a data structure having a matrix format whose elements corresponds to the correlation values with respect to all combinations of each indicator, and is a data indicates the correlation between indicators. In the following description the correlation matrix data 400 that is calculated from the business data 130 is supposed to have been stored in the storage apparatus 104 in advance.

Returning to the description of FIG. 1, the programs and the information stored in the memory 102 will be described next.

The memory 102 stores therein a program configured to realize a graph process unit 110. The graph process unit 110 converts the correlation matrix data 400 into graph data, or in other words, generates the graph data from the correlation matrix data 400. Also, the graph process unit 110 executes an arbitrary graph process by using the graph data. The graph process unit 110 includes a plurality of program modules. To be more specific, the graph process unit 110 includes an edge information amount calculation unit 111, a control factor calculation unit 112, a graph data generation unit 113, a graph process unit 114 and a graph data storage unit 115.

The edge information amount calculation unit 111 reads out the elements of the correlation matrix data 400 from the storage apparatus 104 to calculate edge information amount which indicates the relation between the correlation value and the number of edges. Also, the edge information amount calculation unit 111 outputs the calculated edge information amount to the control factor calculation unit 112. Here, the edge information amount is information for estimating the number of edges which may be included in a case of converting the correlation matrix data 400 into the graph data. The details of the process executed by the edge information amount calculation unit 111 will be described below with reference to FIG. 6.

The control factor calculation unit 112 calculates control factor which will be used for data compression in a case of converting the correlation matrix data 400 into the graph data. According to the present embodiment, the control factor calculation unit 112 calculates, as the control factor, a threshold in order to make adjustment the number of edges to be included in the graph data based on the edge information amount and the target process time. Also, the control factor calculation unit 112 outputs the calculated control factor to the graph data generation unit 113. The details of the process executed by the control factor calculation unit 112 will be described below with reference to FIG. 8.

The graph data generation unit 113 generates the graph data from the correlation matrix data 400 by using the calculated control factor. The graph data generation unit 113 stores the generated graph data in the graph data storage unit 115, and transmits the generated graph data to the user terminal 210. The details of the process executed by the graph data generation unit 113 will be described below with reference to FIG. 11.

The graph process unit 114 executes an arbitrary graph process by using the graph data. The graph process may include, for example, a PageRank process which may be used for calculating an eigenvalue for the matrix calculation, or a calculation process for centrality. Note that the present invention is not limited to the details of the graph process, and that various graph algorithms applicable for general use may be applied thereto. The graph process unit 114 transmits the results of the graph process to the user terminal 210.

Figure 5:
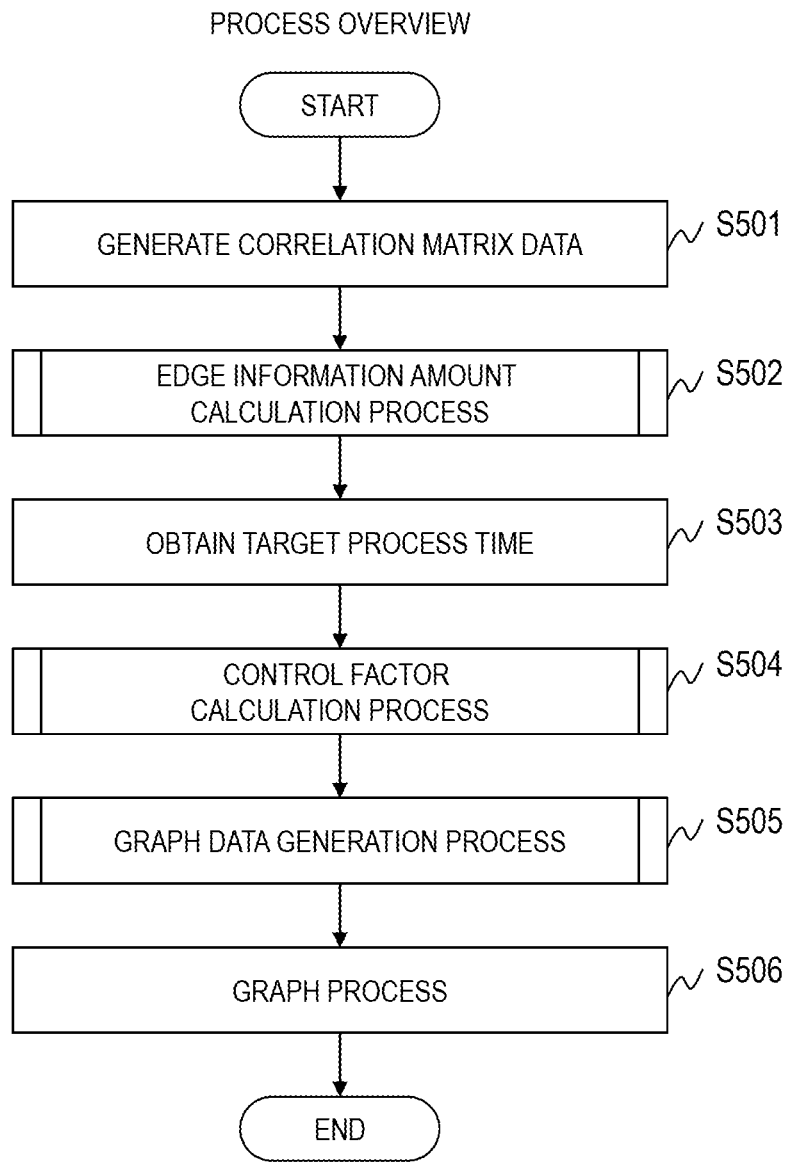
FIG. 5 is flowchart for explaining an outline of process executed by the graph process apparatus according to the first embodiment of the present invention.

Next, the process executed by the graph process apparatus 100 according to the present embodiment will be described. FIG. 5 is flowchart for explaining an outline of the process executed by the graph process apparatus 100 according to the first embodiment of the present invention.

The graph process apparatus 100 is configured to execute the process which will be described below periodically or in a case of receiving a start instruction for a process from the user terminal 210.

The graph process apparatus 100 generates the correlation matrix data 400 from the business data 130 stored in the storage apparatus 104 (Step S501). More specifically, the graph process unit 110 generates the correlation matrix data 400. Note that in a case the correlation matrix data 400 is stored in the storage apparatus 104 the process in Step S501 may be omitted.

The graph process apparatus 100 executes an edge information amount calculation process (Step S502). More specifically, the edge information amount calculation unit 111 analyzes the correlation matrix data 400, and calculates the edge information amount based on the result of the analysis. The details of the edge information amount calculation process executed by the edge information amount calculation unit 111 will be described below with reference to FIG. 6.

The graph process apparatus 100 obtains the target process time from the user terminal 210 (Step S503). More specifically, the graph process unit 110 requests the user terminal 210 to input the target process time. At this point, the user interface 211, upon receiving the request, displays an operation screen configured to allow an input of the target process time on the display, or the like, and transmits the target process time that is inputted via the operation screen to the graph process apparatus 100. The graph process apparatus 100 inputs the target process time received from the user terminal 210 to the control factor calculation unit 112.

The graph process apparatus 100 executes a control factor calculation process by using the edge information amount and the target process time (Step S504). More specifically, the control factor calculation unit 112 calculates the control factor which is used for generating compressed graph data by using the edge information amount and the target process time. The details of the control factor calculation process executed by the control factor calculation unit 112 will be described below with reference to FIG. 8.

The graph process apparatus 100 executes a graph data generation process by using the control factor (Step S505). More specifically, the graph data generation unit 113 generates the graph data from the correlation matrix data 400 by using the calculated control factor. The details of the graph data generation process executed by the graph data generation unit 113 will be described below with reference to FIG. 11.

The graph process apparatus 100 executes a graph process by using the generated graph data (Step S506). More specifically, the graph process unit 114 executes a prescribed graph process by using the generated graph data, and transmits the results of the graph process to the user terminal 210.

Figure 6:
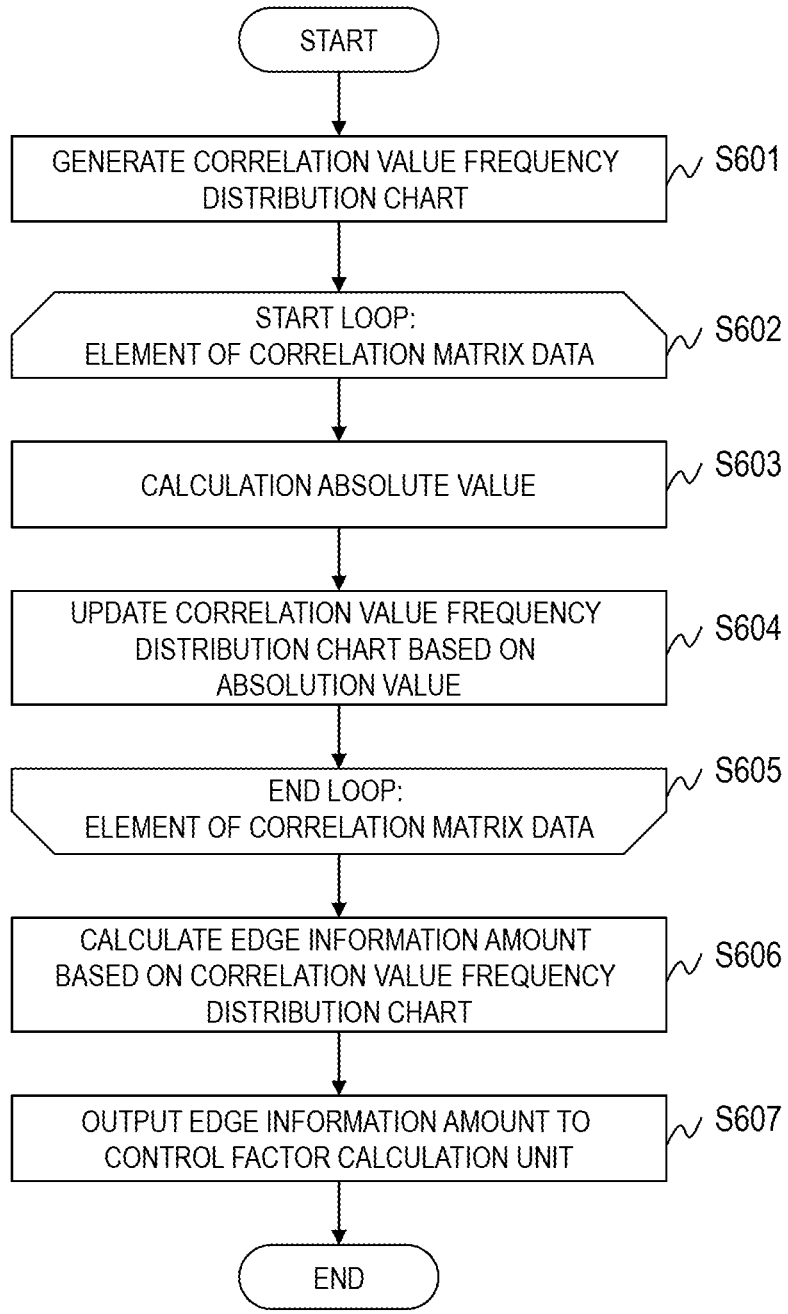
FIG. 6 is a flowchart for explaining an example of edge information amount calculation process according to the first embodiment of the present invention.
Figure 7A:
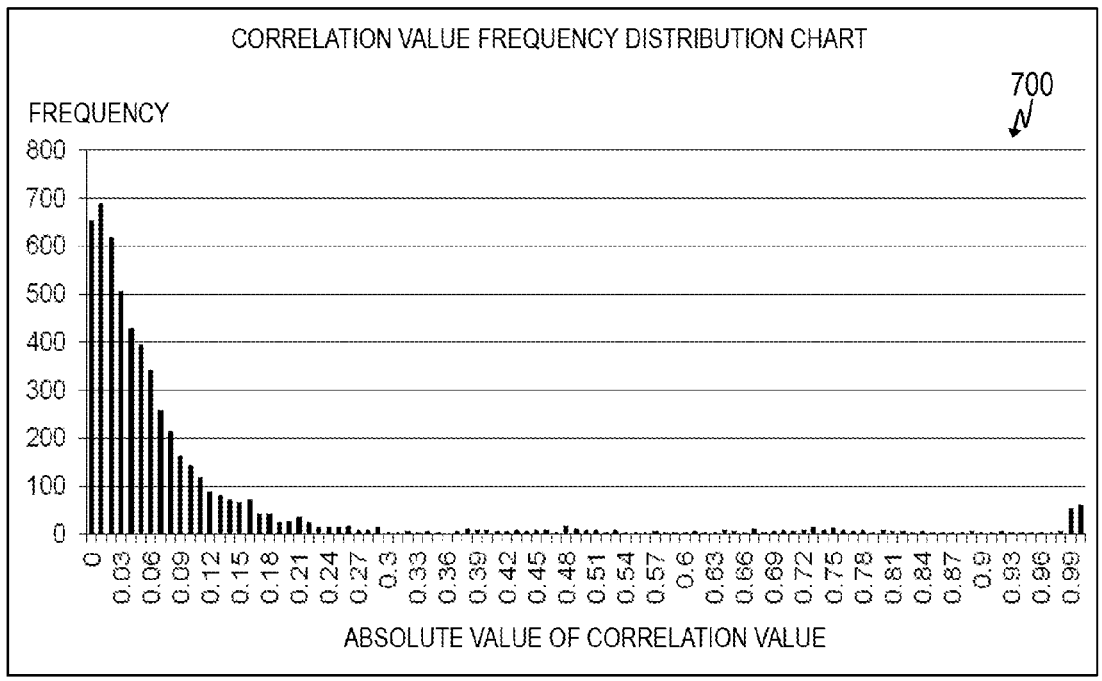
FIG. 7A is an explanatory diagram illustrating an example of a correlation value frequency distribution chart according to the first embodiment of the present invention.
Figure 7B:
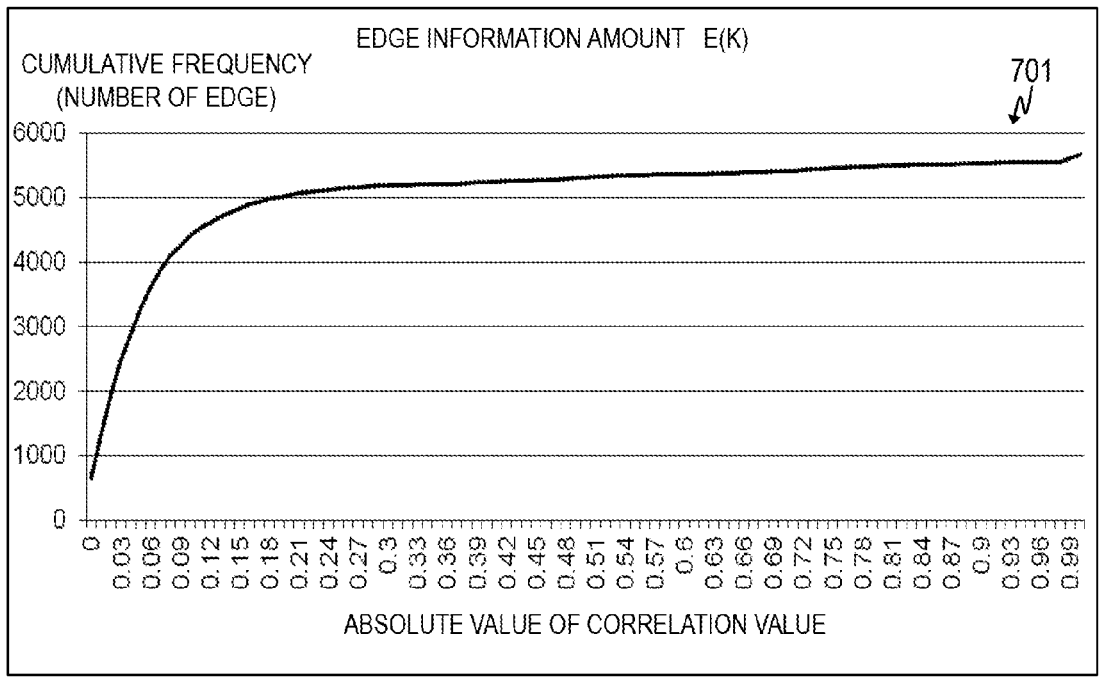
FIG. 7B is an explanatory diagram illustrating an example of edge information amount according to the first embodiment of the present invention.

FIG. 6 is a flowchart for explaining an example of the edge information amount calculation process according to the first embodiment of the present invention. FIG. 7A is an explanatory diagram illustrating an example of a correlation value frequency distribution chart 700 according to the first embodiment of the present invention. FIG. 7B is an explanatory diagram illustrating an example of the edge information amount according to the first embodiment of the present invention.

The edge information amount calculation unit 111 generates the correlation value frequency distribution chart (histogram) 700 of the correlation matrix data 400 (Step S601).

Here, the correlation value frequency distribution chart. 700 is a histogram for showing the frequency distribution counted for each predetermined range of correlation values, as graph shown in FIG. 7A. In FIG. 7A, the range of the value is "0.01." Note that the range of the value for the correlation value frequency distribution chart 700 is preset. However, the range of the value may be modified based on external input.

The edge information amount calculation unit 111 starts a loop process of the elements of the correlation matrix data 400 (Step S602). First, the edge information amount calculation unit 111 selects one element from the correlation matrix data 400, and reads out a value (correlation value) of the selected element.

The edge information amount calculation unit 111 calculates an absolute value for the read out value of the element, that is, an absolute value of the correlation value (Step S603). The edge information amount calculation unit 111 updates the correlation value frequency distribution chart 700 based on the calculated absolute value of the correlation value (Step S604). More specifically, the edge information amount calculation unit 111 adds 1 to the frequency of the range that includes the absolute value of the correlation value. Note that the edge information amount calculation unit 111 deletes the read out value of the element after the correlation value frequency distribution chart 700 is updated.

The edge information amount calculation unit 111 determines whether or not the process has been complete with respect to all the elements of the correlation matrix data 400 (Step S605). In a case where it is determined that the process has not been complete with respect to all the elements of the correlation matrix data 400, the edge information amount calculation unit 111 returns to Step S602 to execute the same process. On the other hand, in a case where it is determined that the process has been complete with respect to all the elements of the correlation matrix data 400, the edge information amount calculation unit 111 proceeds to Step S606.

In a case where the loop process of the elements of the correlation matrix data 400 is complete, the correlation value frequency distribution chart 700 will be as shown in FIG. 7A.

The edge information amount calculation unit 111 calculates the edge information amount based on the correlation value frequency distribution chart 700 (Step S606), and outputs the calculated edge information amount to the control factor calculation unit 112 (Step S607). Then, the edge information amount calculation unit 111 ends the process. More specifically, the following process will be executed.

The edge information amount calculation unit 111 calculates a total value of the frequencies up to an absolute value "k" of the correlation values, in other words, the edge information amount calculation unit 111 calculates cumulative frequencies of the frequencies. The calculated cumulative frequencies are plotted with the absolute value of the correlation values on the horizontal axis and the cumulative frequency of the frequencies on the vertical axis. The edge information amount calculation unit 111 calculates, as the edge information amount, a function E(k) which indicates a relation between the absolute value of the correlation value and the cumulative frequency based on the results of the plotting. According to the present embodiment, the edge information amount E(k) is given as the graph 701 illustrated in FIG. 7B.

The cumulative frequency indicates the total value of the frequencies of the correlation values whose absolute value in the correlation value frequency distribution chart 700 of the correlation value includes up to "k". For example, E(0.3) includes the total value of the frequencies whose absolute value of the correlation values include between "0" and "0.3." Accordingly, E(1) corresponds with the number of all elements of the correlation matrix data 400.

Figure 8:
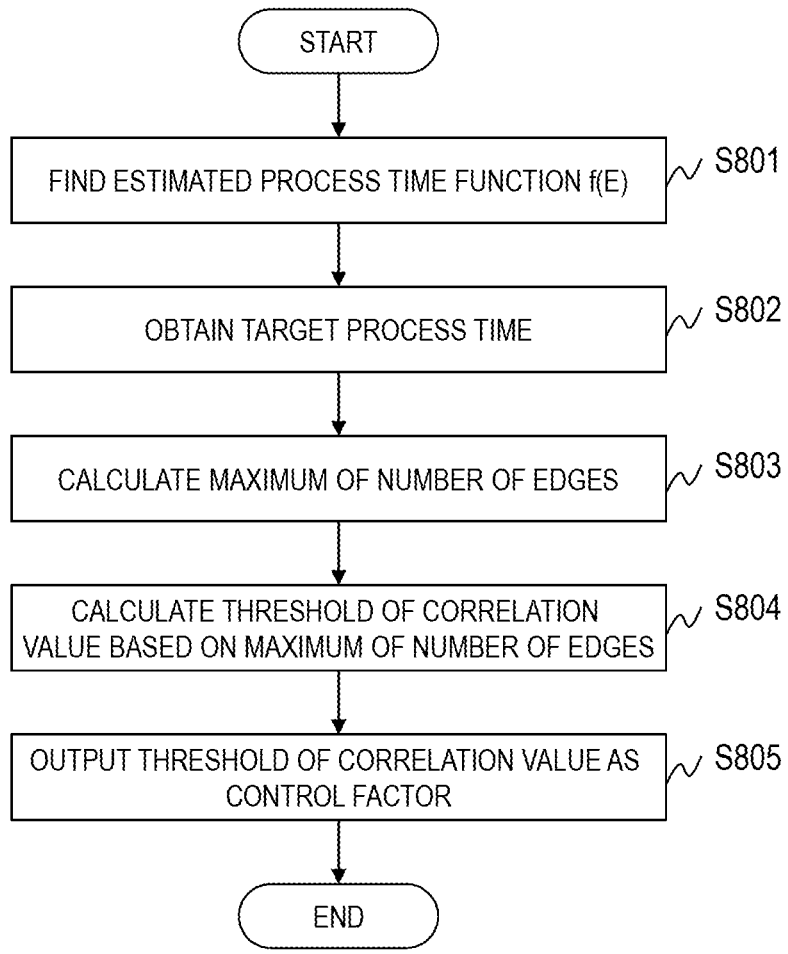
FIG. 8 is a flowchart explaining an example of control factor calculation process of according to the first embodiment of the present invention.
Figure 9:
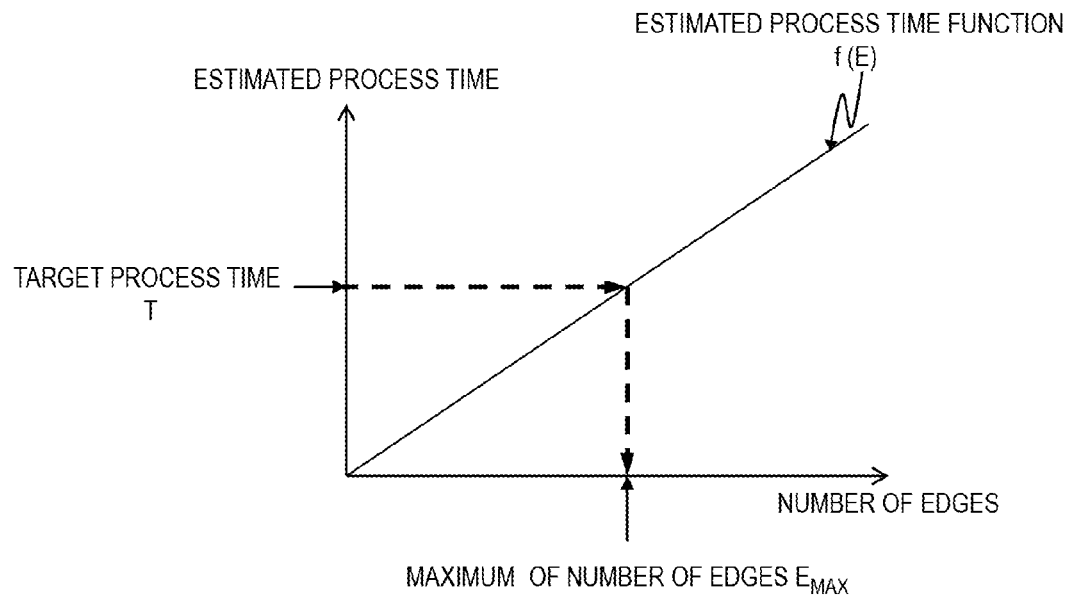
FIG. 9 is an explanatory diagram illustrating an example of an estimated process time function f(E) according to the first embodiment of the present invention.
Figure 10:
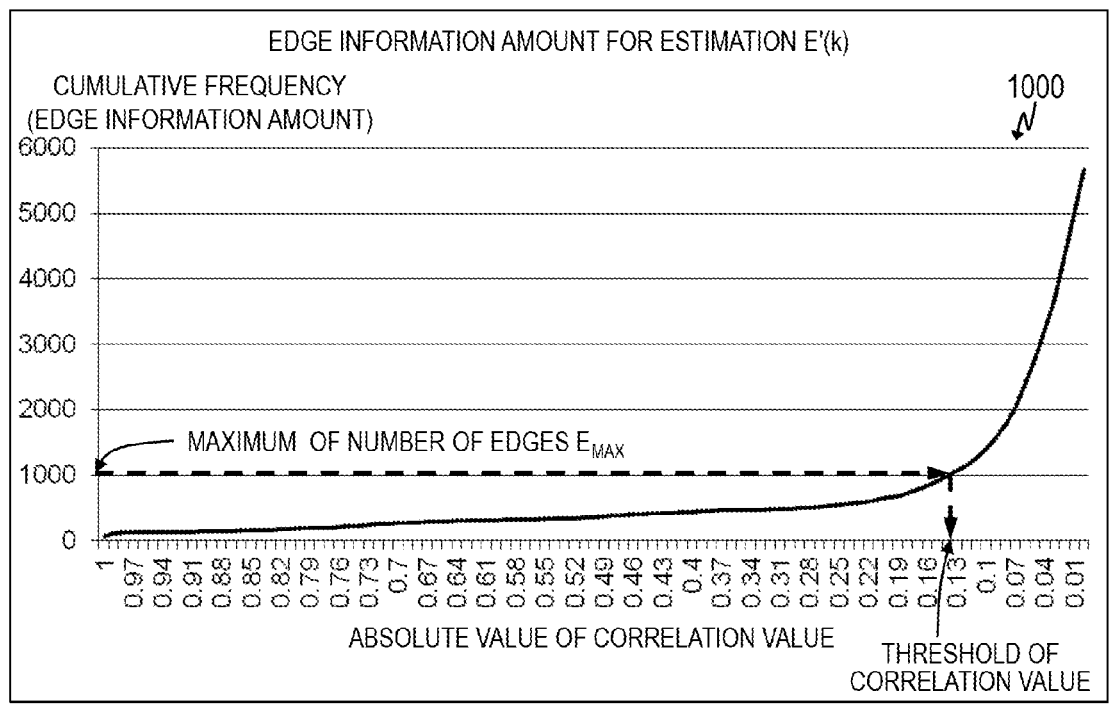
FIG. 10 is an explanatory diagram illustrating an example of an edge information amount for estimation used for determining the control factor according to the first embodiment of the present invention.

FIG. 8 is a flowchart explaining an example of the control factor calculation process according to the first embodiment of the present invention. FIG. 9 is an explanatory diagram illustrating an example of an estimated process time function f(E) according to the first embodiment of the present invention. FIG. 10 is an explanatory diagram illustrating an example of an edge information amount for estimation used for determining the control factor according to the first embodiment of the present invention.

The control factor calculation unit 112 starts a process when edge information amount is inputted thereto. The control factor calculation unit 112 finds an estimated process time function f(E) which includes the edge information amount E (k) as a variable (Step S801).

The control factor calculation unit 112 can calculate the estimated process time function f(E) based on an algorithm of the graph analysis process. For example, in a case of solving an eigenvalue problem for principle component analysis in the graph analysis process, the estimated process time function f(E) may be obtained from equation (2) below where "a" is the number of the convergent calculation of algorithm is repeated, "b" is a process time for each unit of edge, and "E" is the variable.

[Equation 2]

$$f(E) = a \times b \times E \quad (2)$$

FIG. 9 illustrates the estimated process time function f(E) obtained from the formula (2). Note that the edge information amount E(k) is assigned as a domain of the estimated process time function f(E).

Next, the control factor calculation unit 112 obtains the target process time from the user terminal 210 (Step S802). For example, the control factor calculation unit 112 requests the user terminal 210 to input the target process time. The user terminal 210, upon receiving the request via the user interface 211, displays an operation screen, or the like, for the target process time to be inputted. Note that T indicates the target process time that is obtained in the following description.

The control factor calculation unit 112, by using the target process time and the estimated process time function f(E), calculates a maximum of the number of edges $E_{MAX}$ that the graph process within the target process time to complete (Step S803).

According to the present embodiment, the control factor calculation unit 112 can calculates the maximum of the number of edges E from the equation (2). More specifically, the maximum of the number of edges $E_{MAX}$ is calculated as shown in equation (3) below. The dotted line in FIG. 9 indicates the maximum of the number of edges $E_{MAX}$ calculated by using the equation (3).

[Equation 3]

$$E_{MAX} = \frac{T}{a \times b} \quad (3)$$

The control factor calculation unit 112 calculates a threshold of the correlation value by using the edge information amount E(k) and the maximum of the number of edges $E_{MAX}$ (Step S804). More specifically, the following process will be executed.

First, the control factor calculation unit 112 finds the edge information amount for estimation E'(K) by using the edge information amount E(k). According to the present embodiment, the edge information amount for estimation E'(K) is calculated as shown in the equation (4) below. The edge information amount for estimation E'(K) is provided as a graph 1000 as illustrated in FIG. 10.

[Equation 4]

$$E'(k) = E(1) - E(k) \quad (4)$$

The control factor calculation unit 112 calculates the threshold of the correlation value by using the edge information amount for estimation E'(k) and the maximum of the number of edges $E_{MAX}$. More specifically, the control factor calculation unit 112 calculates the absolute value k of the correlation value by obtaining equation (5) as shown below by changing the left side of the equation (4) to $E_{MAX}$. The calculated absolute value k of the correlation value becomes the threshold of the correlation value. The dotted line in FIG. 10 indicates the threshold of the correlation value calculated by using the equation (5). The threshold of the correlation value, as will be described below, is used as a threshold (control factor) for rounding off the correlation values in the graph data generation process.

[Equation 5]

$$E(k) = E(1) - E_{MAX} \quad (5)$$

The control factor calculation unit 112 outputs the calculated threshold of the correlation value as the control factor to the graph data generation unit 113 (Step S805), and ends the process.

Figure 11:
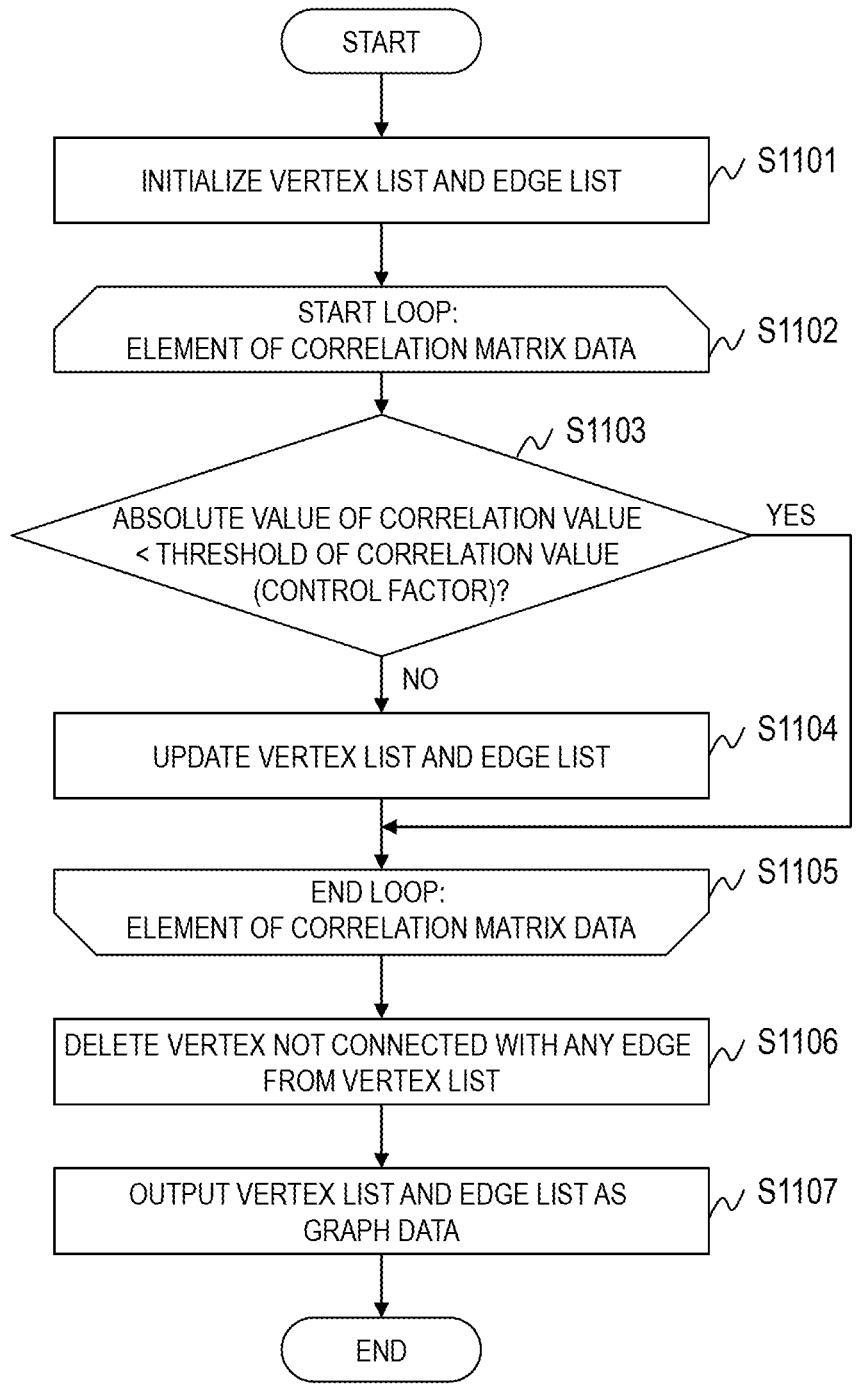
FIG. 11 is a flowchart for explaining an example of graph data generation process according to the first embodiment of the present invention.
Figure 13:
FIG. 13 is an explanatory diagram illustrating a concept of rounding off correlation values by using the control factor in the graph data generation process according to the first embodiment of the present invention.
Figure 15:
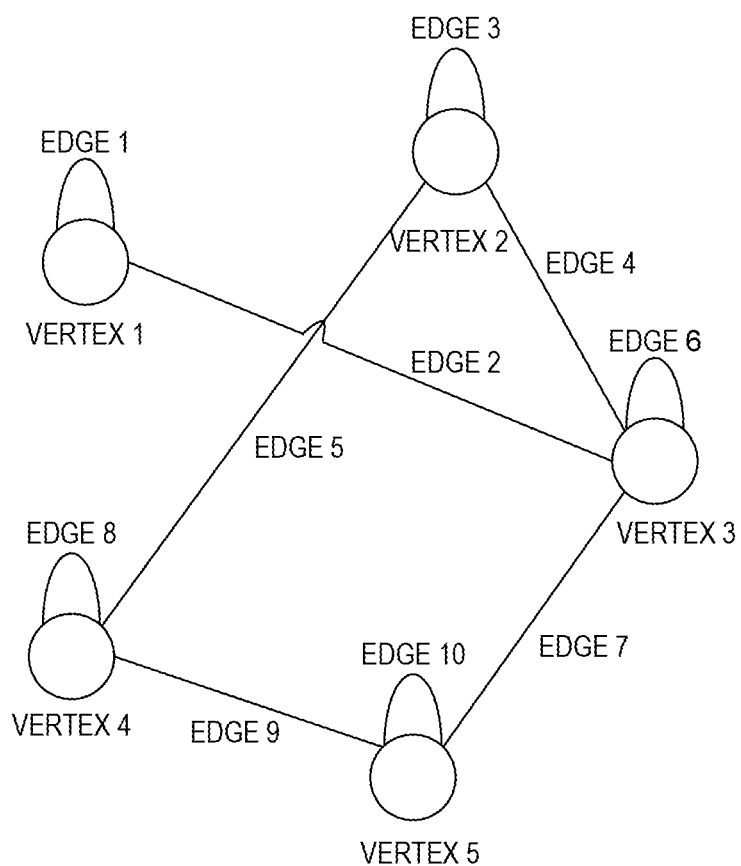
FIG. 15 is an explanatory diagram illustrating an example of a graph which will be displayed based on graph data according to the first embodiment of the present invention.

FIG. 11 is a flowchart for explaining an example of the graph data generation process according to the first embodiment of the present invention. FIG. 12A is an explanatory diagram illustrating an example of a vertex list 1200 which will be used for the graph data generation process according to the first embodiment of the present invention. FIG. 12B is an explanatory diagram illustrating an example of an edge list 1210 which will be used for the graph data generation process according to the first embodiment of the present invention. FIG. 13 is an explanatory diagram illustrating a concept of rounding off correlation values by using control factor in the graph data generation process according to the first embodiment of the present invention. FIG. 14A and FIG. 14B are explanatory diagram illustrating the vertex list 1200 and the edge list 1210 after being executed the graph data generation process according to the first embodiment of the present invention. FIG. 15 is an explanatory diagram illustrating an example of a graph which will be displayed based on the graph data according to the first embodiment of the present invention.

First, the vertex list 1200 and the edge list 1210 will be described.

The vertex list 1200 is information for managing the information on the vertexes (indicators) of the graph data and on the edges connecting the vertexes. The vertex list 1200 illustrated in FIG. 12A includes a vertex ID 1201, an indicator ID 1202, and a connected edge information 1203.

The vertex ID 1201 stores therein identification information which is for uniquely identifying the vertexes. Note that a unique vertex ID is assigned to each of the vertexes. The indicator ID 1202 includes identification information of an indicator that corresponds with the vertex. In the graph data, one indicator is managed as one vertex. The connected edge information 1203 is information on the edge that is connected with the vertex that corresponds with the vertex ID 1201.

The edge list 1210 is information for managing the edges of the graph data. The edge list 1210 illustrated in FIG. 12B includes an edge ID 1211, a connected vertex A 1212, a connected vertex B 1213 and a weight 1214.

The edge ID 1211 stores therein identification information which is for uniquely identifying the vertexes. Note that a unique edge ID is assigned to each of the edges. The connected vertex A 1212 and the connected vertex B 1213 store identification information of two vertexes connected by an edge. The weight 1214 stores the weight of the edge, in other words, the weight 1214 stores the correlation value.

The graph data generation unit 113 starts the process when the control factor is inputted. The graph data generation unit 113 first initializes the vertex list 1200 and the edge list 1210 (Step S1101).

More specifically, the graph data generation unit 113 generates entries for each of the indicators included in the correlation matrix data 400 for the vertex list 1200, and sets the identification information of the indicator to the indicator ID 1202 of each of the entries that is generated. The graph data generation unit 113 assigns the vertex ID to each of the indicators, and sets the assigned vertex ID to the vertex ID 1201 of each of the entries. At this time, the connected edge information 1203 is empty. Also, the graph data generation unit 113 generates the edge list 1210 that is empty.

The graph data generation unit 113 starts a loop process of the element of the correlation matrix data 400 (Step S1102). First, the graph data generation unit 113 reads out one element from the correlation matrix data 400. Note that since reading out each of the elements by the graph data generation unit 113 would generate frequent I/Os, the element may be read out per unit of a row of the correlation matrix data 400 and the read out element is temporarily stored in the memory 102, for example.

The graph data generation unit 113 determines whether or not the absolute value of the correlation value of the read out element is smaller than the threshold (control factor) of the correlation value (Step S1103). In a case where it is determined that the absolute value of the correlation value of the read out element is smaller than the threshold (control factor) of the correlation value, the graph data generation unit 113 proceeds to Step S1105.

In a case where it is determined that the absolute value of the correlation value of the read out element is equal to or greater than the threshold (control factor) of the correlation value, the graph data generation unit 113 updates the vertex list 1200 and the edge list 1210 (Step S1104). More specifically, the following process will be executed.

The graph data generation unit 113 adds an entry to the edge list 1210, and sets the identification information of an edge to the edge ID 1211 of the added entry. Also, the graph data generation unit 113 sets two indicators that correspond with the read out element to the connected vertex A 1212 and the connected vertex B 1213 of the added entry. Further, the graph data generation unit 113 sets the correlation value of the read out element to the weight 1214 of the added entry.

The graph data generation unit 113 refers the vertex list 1200 to retrieve the entry that corresponds with the identification information of the indicator whose indicator ID 1202 is set at the connected vertex A 1212. The graph data generation unit 113 sets the identification information of the edge that is set at the edge ID 1211 to the connected edge information 1203 of the retrieved entry. In the similar manner, the graph data generation unit 113 retrieves the entry that corresponds with the identification information of the indicator whose indicator ID 1202 is set at the connected vertex B 1213, and sets the identification information of the edge to the connected edge information 1203 of the entry.

Note that in a case the connected edge information 1203 is set the identification information of the edge that is the same as the identification information of the edge that is scheduled to be added, the graph data generation unit 113 will not set the identification information of the edge that is scheduled to be added. This is because there is no need to add information.

The above is the description for the process of Step S1104.

The graph data generation unit 113 determines whether or not the process has been complete with respect to all the elements of the correlation matrix data 400 (Step S1105). In a case where it is determined that the process has not been complete with respect to all the elements of the correlation matrix data 400, the graph data generation unit 113 returns to Step S1102 to execute the same process. On the other hand, in a case where it is determined that the process has been complete with respect to all the elements of the correlation matrix data 400, the graph data generation unit 113 proceeds to Step S1106.

As shown in shown in FIG. 13, the loop process of the elements of the correlation matrix data 400 corresponds to a process includes step of setting the value of the element whose the absolute value of the correlation value is smaller than the threshold (control factor) of the correlation value to "0", and step of generating the graph data.

The graph data generation unit 113 refers the vertex list 1200, and deletes the entry of the vertex that is not connected with any edge from the vertex list 1200 (Step S1106). More specifically, the graph data generation unit 113 retrieves entries each of which has no identification information of any edges stored in the connected edge information 1203, and deletes such entries from the vertex list 1200.

When the above process ends, the vertex list 1200 and the edge list 1210 will be as shown in FIGS. 14A and 14B.

The graph data generation unit 113 outputs the vertex list 1200 and the edge list 1201 as the graph data (Step S1107), and ends the process. According to the present embodiment the graph data generation unit 113 outputs the vertex list 1200 and the vertex ID 1201 to the graph data storage unit 115, and transmits the same to the user terminal 210. The user terminal 210 will be operable to display a graph as shown in FIG. 15 based on the received graph data.

Note that while the graph data according to the present embodiment includes the vertex list 1200 and the vertex ID 12010, the present invention is not limited thereto; the graph data may include another graph representation method.

Here, the data amount of the correlation matrix data 400 and the data amount of the graph data will be described with reference to FIG. 4, FIG. 14A, FIG. 14B, and FIG. 15.

As shown in FIG. 4, the 5-by-5 correlation matrix data 400 is required to include the correlation value for each of 25 combinations of indicators. On the other hand, the graph data is only required to include information on 5 vertexes and information on 10 edges including the weights of each of the edges. Accordingly, the graph process apparatus 100 can compress the data amount by converting the correlation matrix data 400 to the graph data.

According to the first embodiment, the graph process apparatus 100 not only does it simply convert the correlation matrix data 400 into graph data, it also adjusts the number of edges included in the graph data so that a process is completed within the target process time by using the control factor, and then generates the graph data. By this, the generated graph data becomes data that is further compressed, which allows data to be arranged at the memory 102 and enables a high speed graph analysis process by using the graph data on the memory 102. That is, the first embodiment is operable to compress the correlation matrix data into the graph data, reduce the amount of data in big data analytics such as the correlation analysis or the principal component analysis, or the like, having a large number of the indicators, and achieve high speed processing.

(Modification)

According to the first embodiment, the amount of data included in the edges is reduced by treating the elements whose the absolute value of the correlation value is smaller than the threshold of the correlation value as "0", but the present invention is not limited thereto. For example, the graph data generation unit 113 may extract only the elements whose the absolute value of the correlation value is greater than the threshold of the correlation value, and generate the graph data from the extracted elements.

Second Embodiment

Next, a second embodiment will be described. The second embodiment is operable to take, not only the target process time, but a memory limit amount specified by a user into consideration, and generates the graph data that is more compressed. More specifically, the control factor calculation unit 112 calculates the threshold for adjusting the number of edges which will be included in the graph data, and the number of bits representing the weight of the edge as the control factors. By this, the graph process apparatus 100 can reduce the number of edges, and further compress the amount of data by rounding off the number of bits representing the weight of the edge. Note that the configuration in the second embodiment having the same configuration as in the first embodiment will be assigned with the same numeral as those in the first embodiment and the description thereof will be omitted.

Figure 16:
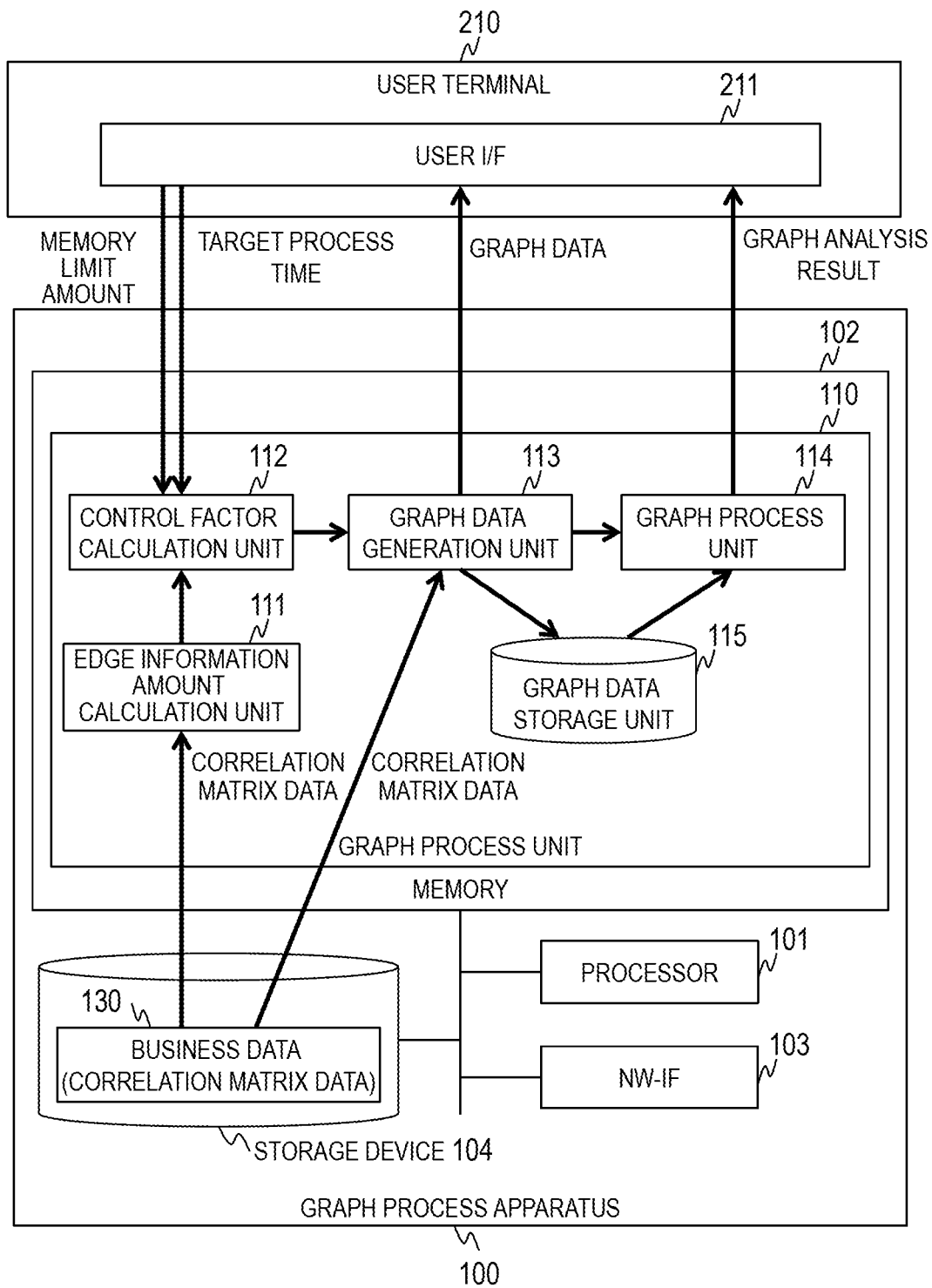
FIG. 16 is a block diagram illustrating an example of a configuration of the graph process apparatus according to a second embodiment of the present invention.

FIG. 16 is a block diagram illustrating an example of a configuration of the graph process apparatus 100 according to the second embodiment of the present invention. Note that since the system configuration in which the graph process apparatus 100 according to the second embodiment is applied is the same as that for the first embodiment, the description of the system configuration will be omitted.

As shown in FIG. 16, the user terminal 210 according to the second embodiment is different from the user terminal 210 according to the first embodiment in that it includes not only the input of the target process time, but also the input of the memory limit amount. The control factor calculation unit 112 calculates the threshold of the correlation value and the number of rounding bits to the weight of the edge based on the target process time and the memory limit amount. Other configurations are the same as those of the first embodiment.

Note that since the data format of the correlation matrix data 400 according to the second embodiment is the same as that for the first embodiment, the description thereof will be omitted. The outline of the process executed by the graph process apparatus 100 according to the second embodiment is also the same as that for the first embodiment, and therefore, the description thereof will be omitted. Further, the edge information amount calculation process according to the second embodiment is the same as that for the first embodiment, and therefore, the description thereof will be omitted. Note that parts of the control factor calculation process and the graph data generation process according to the second embodiment will be different from their counterparts in the first embodiment.

Figure 17:
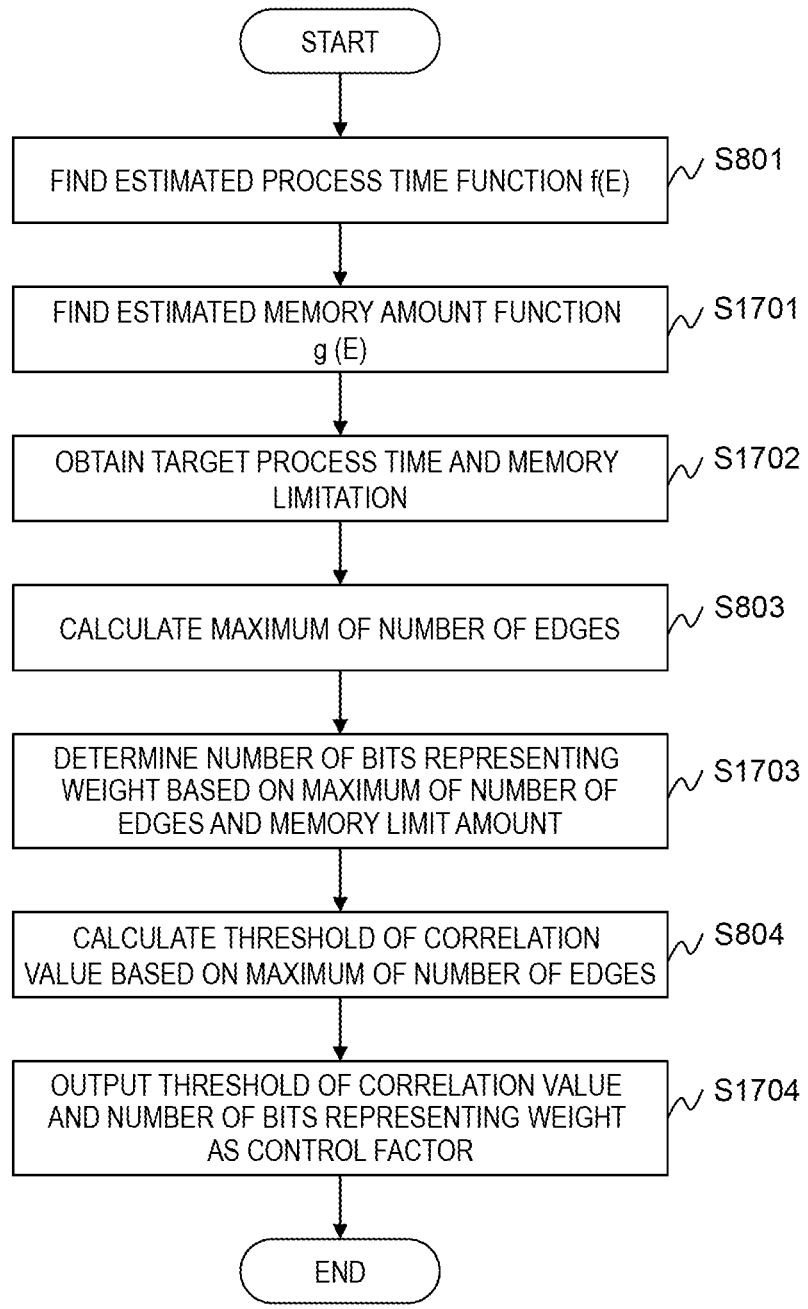
FIG. 17 is a flowchart for explaining an example of the control factor calculation process according to the second embodiment of the present invention.
Figure 18A:
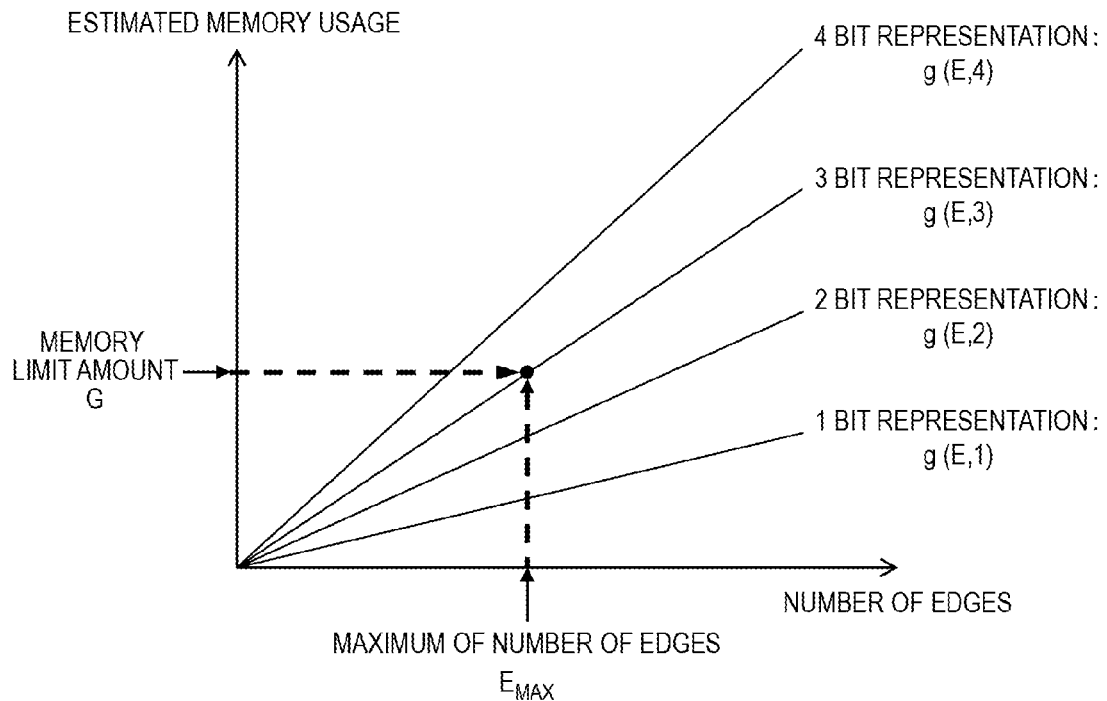
FIG. 18A and FIG. 18B are explanatory diagram illustrating an example of an estimated memory utilization function g(E, B) according to the second embodiment of the present invention.
Figure 18B:
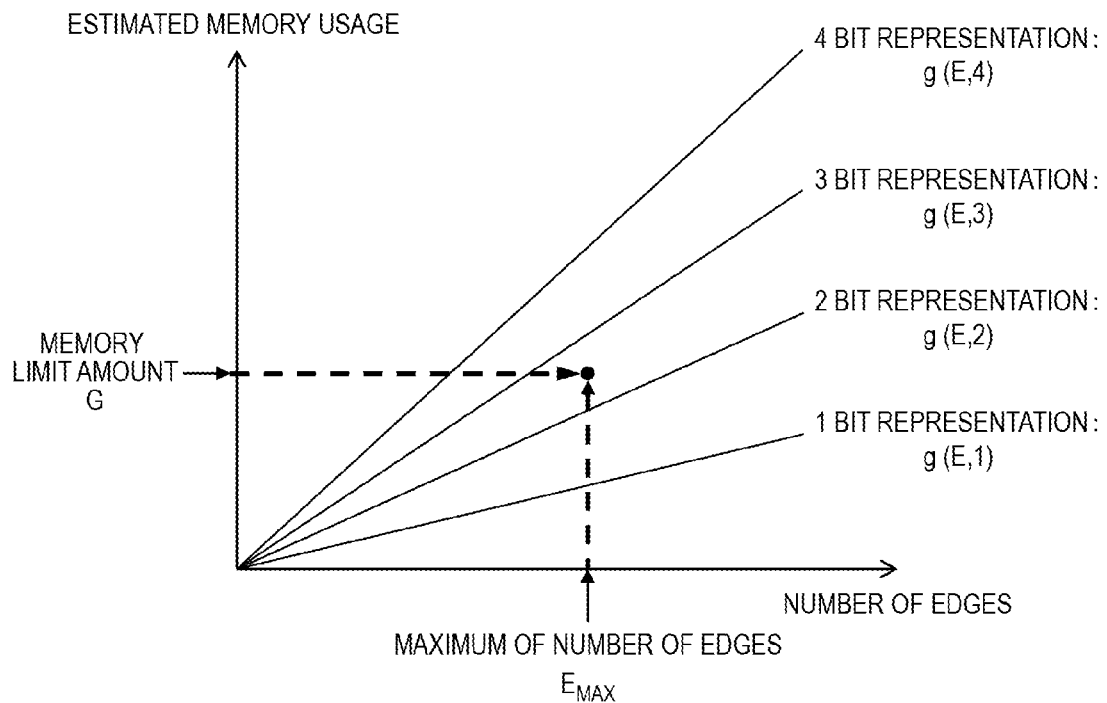

FIG. 17 is a flowchart for explaining an example of the calculation process of the control factor according to the second embodiment of the present invention. FIG. 18A and FIG. 18B each are explanatory diagram illustrating an example of an estimated memory utilization function g(E, B) according to the second embodiment of the present invention. FIG. 19 is an explanatory diagram illustrating an example of rounding of bits representing the correlation value according to the second embodiment of the present invention.

For the control factor calculation process according to the second embodiment, the control factor calculation unit 112 calculates the estimated process time function f(E), and then calculates the estimated memory utilization function g(E, B) with respect to the edge information amount for each bit representing the correlation value (Step S1701). Here, E indicates the number of edges, and B indicates the number of representation bits.

There is a plurality of the estimated memory utilization functions g(E, B) depending on how many bits are used for represent the weight of the edge. For example, the estimated memory utilization function g(E, B) may be obtained via equation (6) where x indicates the memory utilization for each edge when 1 bit represents the weight, E indicates the number of edges, and y indicates the number of bits of the edge.

[Equation 6]

$$g(E,y) = x \times y \times E \quad (6)$$

FIG. 18A and FIG. 18B illustrate the estimated memory utilization function g(E, B) obtained from the equation (6). Note that the edge information amount E(k) will be given as a domain for the estimated memory utilization function g(E, B).

After Step S1701, the control factor calculation unit 112 obtains the target process time and the memory limit amount from the user terminal 210 (Step S1702). A method for obtaining the memory limit amount may include the same method for obtaining the target process time. Note in the following description that T denotes the obtained target process time and G denotes the obtained memory limit amount.

The control factor calculation unit 112, after calculating the maximum of the number of edges $E_{MAX}$ (Step S803), determines the number of bits representing the weight of the edge based on the maximum of the number of edges, the memory limit amount, and the estimated memory utilization function g (E, B) (Step S1703). More specifically, the following process will be executed.

The control factor calculation unit 112 substitutes the maximum of the number of edges $E_{MAX}$ for each estimated memory utilization function g(E, B) to calculate the estimated memory utilization. The control factor calculation unit 112 extracts the calculated estimated memory utilization that satisfies equation (7) below.

[Equation 7]

$$g(E_{MAX}, B) \leq G \quad (7)$$

The control factor calculation unit 112 identifies the estimated memory utilization having the largest bit number from among the estimated memory utilizations satisfying the equation (7), and determines the identified bit number as the number of bits representing the weight of the edge.

For example, in the example shown in FIG. 18A, the number of bits representing the weight of the edge is determined as 3 bits, while in the example shown in FIG. 18B, the number of bits representing the weight of the edge is determined as 2 bits.

The control factor calculation unit 112, after calculating the threshold of the correlation value (Step S804), outputs the threshold of the correlation value and the number of representation bits as the control factors to the graph data generation unit 113 (Step S1704), and ends the process.

The flow of the graph generation process according to the second embodiment is the same as the flow of the graph generation process according to the first embodiment (See FIG. 11). Note, however, that the process for Step S1104 is partially different from its counterpart.

More specifically, in a case of setting the correlation value to the weight 1214 of the entry added to the edge list 1210, the graph data generation unit 113 rounds the correlation value based on the number of representation bits inputted as the control factors, and sets the rounded correlation value to the weight 1214.

For example, when the number of representation bits of the correlation value prior to the rounding is 4 bits and that will be rounded as 3 bits, the most signification bit will be a sign bit. For example, when it is "0," it needs to be arranged to correspond with a "positive" correlation value; when it is "1," it needs to be arranged to correspond with a "negative" correlation value. Also, an encoding, such as one shown in FIG. 19, may be assigned in accordance with the size of the absolute value of the correlation value. Note that the encoding may include other than what is shown in FIG. 19.

The rest of the process is the same as that for the first embodiment.

According to the second embodiment, it can further compress the graph data by rounding the number of bits representing the weight of the edge based on the memory limit amount. That is, under the limitation of the memory capacity usable in a given system, the second embodiment is operable to generate the graph data whose data amount may be processed within the target process time. By this, the second embodiment is operable to arrange all of the graph data generated from the correlation matrix data 400 over the memory 102, and execute high speed graph processes by using the data arranged over the memory 102.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer comprising a processor and a memory coupled to the processor, configured to execute a process by using correlation matrix data which includes a plurality of elements each of which is a value indicating correlation between a plurality of indicators,
    wherein the computer comprises a graph generation unit configured to generate graph data from the correlation matrix data obtained from a storage apparatus, the graph data includes a plurality of vertexes each of which corresponds to an indicator, a plurality of edges each of which connects two of vertexes having correlation, and a plurality of weights of the plurality of edges each of which indicates a value of a element, wherein the graph process unit includes:
a control factor calculation unit configured to calculate a control factor for generating compressed graph data based on a constraint condition on a process by using the correlation matrix data; and
a graph generation unit configured to generate the graph data from the correlation matrix data by using the control factor,
wherein the control factor calculation unit is configured to:
obtain a target process time which is a completion time for the process by using the correlation matrix data, as the constraint condition;
calculate a maximum of a number of edges to be included in the graph data to complete a process within the target process time;
calculate a threshold for extracting the plurality of elements converted from the correlation matrix data to the graph data based on the maximum of the number of edges; and
output the threshold as the control factor to the graph data generation unit, and
wherein the graph generation unit is configured to:
extract at least one of the plurality of elements from the correlation matrix data based on the threshold, and
generate the graph data by generating information of the plurality of vertexes, the plurality of edges, and the plurality of weights of the plurality of edges based on a combination of the plurality of indicators for identifying the extracted at least one of the plurality of elements and a value of the at least one of the plurality of elements.

2. The computer according to claim 1,
wherein the graph data generation unit is configured to:
set a value of the element of the correlation matrix data whose size is smaller than the threshold as zero, and
extract the at least one of the plurality of elements whose value is not zero from the correlation matrix data.

3. The computer according to claim 2,
wherein the graph data generation unit is configured to extract the at least one of the plurality of elements whose value is greater than the threshold from the correlation matrix data.

4. The computer according to claim 3,
wherein the graph process unit includes an edge information amount calculation unit configured to generate a frequency distribution of a plurality of values of the plurality of elements of the correlation matrix data by analyzing the plurality of elements of the correlation matrix data, and
wherein the control factor calculation unit is configured to:
calculate a function indicating a relation between the number of edges and a completion time for the process by using the correlation matrix data;
calculate the maximum of the number of edges based on the function and the target process time; and
calculate the threshold based on the frequency distribution and the maximum of the number of edges.

5. The computer according to claim 4,
wherein the control factor calculation unit is further configured to:
obtain a limitation of usage of the memory as the constraint condition;
determine, based on the limitation of usage of the memory, a number of representation bit for each of the plurality of weights of the plurality of edges so that a size of the graph data is smaller than the limitation of usage of the memory; and output the threshold and the number of representation bit for the each of the plurality of weights of the plurality of edges as the control factor, and wherein the graph data generation unit is configured to round the plurality of weights of the plurality of edges to the determined number of representation bit.

6. A graph data generation method for a computer including a processor and a memory coupled to the processor, configured to execute a process by using correlation matrix data which includes a plurality of elements each of which is a value indicating correlation between a plurality of indicators, wherein the computer includes a graph generation unit configured to generate graph data from the correlation matrix data obtained from a storage apparatus, the graph data including a plurality of vertexes each of which corresponds to an indicator, a plurality of edges each of which connects two of the vertexes having correlation, a plurality of weights of the plurality of edges each of which includes a value of a element, wherein the graph process unit includes a control factor calculation unit configured to calculate a control factor for generating compressed graph data based on a constraint condition on a process by using the correlation matrix data, wherein the graph data generation method includes:

a first step of obtaining, by the control factor calculation unit, a target process time which is a completion time for the process by using the correlation matrix data as the constraint condition;

a second step of calculating, by the control factor calculation unit, a maximum of a number of edges to be included in the graph data to complete a process within the target process time;

a third step of calculating, by the control factor calculation unit, a threshold for extracting the plurality of elements converted from the correlation matrix data to the graph data based on the maximum of the number of edges; and a fourth step of outputting, by the control factor calculation unit, the threshold as the control factor to the graph data generation unit;

a fifth step of extracting, by the graph generation unit, at least one of the plurality of elements from the correlation matrix data based on the threshold; and a sixth step of generating, by the graph generation unit, the graph data by generating information of the plurality of vertexes, the plurality of edges, and the plurality of weights of the plurality of edges based on a combination of the plurality of indicators for identifying the extracted at least one of the plurality of elements and a value of the at least one of the plurality of elements.

7. The graph data generation method according to claim 6, wherein the fifth step includes steps of:

setting a value of the element of the correlation matrix data whose size is smaller than the threshold as zero; and extracting the at least one of the plurality of elements whose value is zero from the correlation matrix data.

8. The graph data generation method according to claim 7, wherein the fifth step includes a step of extracting the at least one of the plurality of elements whose value is greater than the threshold from the correlation matrix data.

9. The graph data generation method according to claim 8, wherein the graph process unit includes an edge information amount calculation unit configured to generate a frequency distribution of a plurality of values of the plurality of elements of the correlation matrix data by analyzing the plurality of elements of the correlation matrix data, wherein the first step includes a step of calculating a function indicating a relation between the number of edges and a completion time for the process by using the correlation matrix data;

the second step includes a step of calculating the maximum of the number of edges based on the function and the target process time; and the third step includes a step of calculating the threshold based on the frequency distribution and the maximum of the number of edges.

10. The graph data generation method according to claim 9, wherein the first step further includes a step of obtaining a limitation of usage of the memory as the constraint condition, wherein the second step includes a step of determining, based on the limitation of usage of the memory a number of representation bit for each of the plurality of weights of the plurality of edges so that a size of the graph data is smaller than the limitation of usage of the memory, wherein the fourth step includes a step of outputting the threshold and the number of representation bit for the each of the plurality of weights of the plurality of edges as the control factor, and wherein the sixth step includes a step of rounding the plurality of weights of the plurality of edges to the determined number of representation bit.

* * * * *